Patented Nov. 22, 1949

2,489,208

UNITED STATES PATENT OFFICE 2,489,208

MODIFIED SOY PROTEIN AND THE PREPARATION THEREOF

John R. Turner, Fort Wayne, Ind., assignor to Central Soya Company, Inc., Fort Wayne, Ind., a corporation of Indiana No Drawing. Application May 17, 1945, Serial No. 594,373

4 Claims. (Cl. 195—29)

This invention relates to modified soy protein and the preparation thereof, and more particularly to modified glycinin which is particularly adapted for use as a whipping agent for the preparation of nougats, fudge, divinity and cream candies, meringue powders, and the like.

Although soy proteins as such have substantially no whipping properties, it has been found that by controlled modification of the soy protein in accordance with the present invention the protein may be converted to a product which foams readily when agitated with water to yield a large volume of a very stable glistening white foam. The product is admirably suited for use as a replacement for egg albumen and gelatin. In addition, the product possesses unique properties which make it valuable as a blending agent with gelatin since it reduces the tendency of gelatin to set to a tough rubbery gel.

An object of the invention is to prepare modified soy protein which is a superior whipping product. Another object is to provide a process of controlled modification for the soy protein which results in a product that forms a foam of high stability.

It is a further object of the invention to prepare modified soy protein which is relatively soluble in water and which still possesses the desired whipping characteristics. Another object is to provide modified soy protein which is miscible in water in a ratio of one to two and which will whip in this mixture to a fairly light foam. Still another object is to provide a modified soy protein which is substantially free of the beany taste and odor of soy beans and which is light in color. Yet another object is to provide modified soy protein possessing a low bacterial count.

It is another object of the invention to provide modified soy protein which when whipped with water, corn syrup and cane sugar will yield a frappé of good body, high stability, desirable shortness, and substantial freedom from any tendency for the separation of a liquid layer over at least a one-month storage period.

The invention contemplates the modification of soy protein to obtain a product which is relatively soluble in water and in which nevertheless the modification is controlled so as to obtain desirable whipping characteristics.

The chief protein constituent of the soy bean is a globulin protein known as glycinin. The glycinin constitutes in the neighborhood of 90% of the total protein of the soy bean. The product and process of the present invention consist essentially of the modification of the glycinin.

When the modification of soy protein is referred to herein, it will be understood that this constitutes essentially the modification of the glycinin of the soy protein.

In general, the treatment of the soy protein may be in a series of steps in which the glycinin is isolated from the other soy bean constituents and subjected to controlled modification. The steps may consist of the extraction of the protein in soluble form from soy bean meal, the precipitation of the glycinin from the water-soluble extract at or near the isoelectric pH range of the glycinin, the washing of the precipitated glycinin, the enzymatic modification of the glycinin, and heat treatment of the partially modified glycinin.

The invention is applicable to soy protein in any suitable form. Ordinarily, the soy protein stock will consist of soy bean meal to which the process of the invention is applied. However, the invention is also applicable to soy protein in less or more pure form.

In accordance with the invention, the glycinin of the soy protein, which as isolated from the protein is practically insoluble in water at a pH of 5, is modified to render at least a substantial portion of the glycinin water soluble at a pH of 5. In the process of modification, a portion of the glycinin is also hydrolyzed and is found in the product to contain nitrogen in the non-protein form.

In treating soy bean meal, the desired soy protein is separated from the other constituents of the meal. The first step may consist of extraction of the meal, which may be in the form of oil-free flakes, with water or with a dilute alkaline solution at a pH substantially different from the isoelectric point of the glycinin. The isoelectric range of the glycinin is in the neighborhood of a pH of 4.2–4.6, and the extraction liquor should have a pH at least as high as 6 or at least as low as 3. A pH above 8 should be avoided in order to avoid discoloration of the soy protein and deterioration of the whipping properties of the modified protein which is later produced.

Although water may be used for the extraction, an alkaline material, such as sodium sulphite, sodium carbonate or sodium hydroxide is preferably added to the water in a quantity sufficient to bring the pH of the extracting liquor to the desired range. Preferably, this pH is in the neighborhood of 6.4–6.8. Sodium sulphite is particularly suitable for this purpose since it serves not only as an alkaline buffer, but also acts as an antiseptic and produces better quality protein product.

The extraction of the soy bean meal with the dilute alkaline solution may be carried out at a slightly elevated temperature, preferably in the neighborhood of 130° F. The solution is filtered to separate the insoluble materials, diatomaceous earth preferably being used as a filter aid. Instead of filtration, any suitable means of separating the soluble constituents and insoluble constituents, such, for example, as screening or centrifugation may be used. The soluble constituents consist of the bulk of the protein, the soluble carbohydrates, and the soluble inorganic salts. The insoluble constituents consist of the fiber, any residual oil which is present, a portion of the protein, and a portion of the carbohydrates.

The extraction liquor containing the soluble constituents is subjected to the second step of the process, which consists of the precipitation of the glycinin at the isoelectric pH range thereof. This is accomplished by acidifying the solution to adjust the pH to a range in the neighborhood of 4.2–4.6. Sulphur dioxide, hydrochloric acid, or any suitable acidifying medium may be used for adjusting the pH. When the pH is adjusted to the isoelectric range, the glycinin is precipitated in the form of curd solids. Any soluble constituents, including the soluble inorganic salts and carbohydrates, remain unprecipitated. The precipitate is separated by filtration, centrifugation, or other suitable means, and is then washed with water. This washing step is of considerable importance in that thorough washing removes any residual beany taste in the material and also results in the production of a better whipping agent.

The precipitated glycinin curd is modified by subjecting it to controlled enzymatic modification. Although any suitable proteolytic enzyme may be used pepsin has been found more satisfactory in that a substantially greater proportion of water soluble protein is obtained in the product through the use of this enzyme. The modification is carried out under conditions of temperature and pH which are favorable to the activity of the enzyme. In the case of pepsin, a pH in the neighborhood of 2 to 3 and a temperature of 100° F. to 110° F. is to be preferred. The adjustment of the pH may be made by the addition of any suitable acidifying agent, such as sulphuric or hydrochloric acids. However, phosphoric acid has been found to be particularly suitable for this purpose.

The enzymatic modification is carried out by treating the glycinin curd in water wherein the solids content of the solution is in the neighborhood of 11% to 13% by weight within the neighborhood of 0.35% by weight of commercial 1:10,000 potency pepsin at a pH of 2.3 and a temperature of 100° F.

The modification is continued until at least 40% of the glycinin is soluble in water at a pH of 5.0. The product may also contain at least 10% but preferably not more than 35% of the total nitrogen present in the non-protein form. It is important that the modification be limited because if too extensive modification or hydrolysis occurs, the modified protein will not have the desired whipping properties. On the other hand, if the modification is insufficient or too limited, the protein also lacks the desired whipping properties and solubility.

Preferably, the modification is continued until the water solubility of the product is between 40% and 60% at a pH of 5. It is also preferred that the non-protein nitrogen content of the product be in the range of 15% to 30%. Of course, the extent of modification may be varied according to the type of product which it is desired to obtain. When the modified protein is to be used in the form of a frappé, such as for nougats, the modification may be carried on to a point where in the neighborhood of 50% of the modified protein is water-soluble at a pH of 5. This product is substantially miscible in two parts of water and at the same time provides a whipping agent which forms a light stable frappé.

In determining the solubility of the product in water, the method outlined by A. K. Smith and S. J. Circle in Industrial and Engineering Chemistry 30, 1414–1418 (1938) for determining water-soluble nitrogen is used. In accordance with this procedure, one gram of the product is dispersed in 50 ml. of water and the pH of the suspension is then adjusted to 5. The suspension is then mechanically shaken for 30 minutes and the volume brought to 100 ml. in a volumetric flask. The suspension is centrifuged for 30 minutes at a temperature of 22°–26° C. at 2,000 R. P. M. (centrifuge radius 7.5 inches). The product remaining in the supernatant liquid is considered the water-soluble product while that which is removed in the centrifuging is considered as water-insoluble. The term water-soluble as used herein is intended to refer to a product which remains in the supernatant liquid under these conditions.

The term protein or modified protein as used herein refers to a product which is precipitated by trichloroacetic acid under the following conditions: A one gram sample of the product is weighed into a 200 ml. centrifuge bottle and extracted with 40 ml. of 0.8 N (13.6%) trichloroacetic acid for one-half hour in a mechanical shaker. The suspension is centrifuged for 15 minutes at 2,000 R. P. M. (centrifuge radius 7.5 inches). The supernatant liquid contains the nonprotein fraction, while that portion of the product which is separated by the centrifuge is referred to as protein. This method of determination when applied to non-protein nitrogen is described by H. C. Becker, R. T. Milner, and R. H. Nagel, Cereal Chemistry 17, 447–457 (1940).

Water-soluble protein as referred to herein is that which is precipitated and separated by the Becker trichloracetic acid test, but which remains in the supernatant liquid under the Smith centrifuging test at a pH of 5.0. Water-soluble nitrogen is determined by the Kjeldahl-Gunning-Arnold method on the product remaining in the supernatant liquid after the Smith centrifuge separation. Non-protein nitrogen is determined by the Kjeldahl-Gunning-Arnold method on the supernatant liquid remaining after the Becker trichloroacetic acid test.

When the protein has been modified to the desired extent, the temperature of the solution is raised to between 140° F. and 200° F., preferably approximately 160° F. The elevated temperature should be maintained until the solubility of the modified protein is substantially increased. The heating serves to inactivate the enzyme, to destroy the bulk of the mesophile bacteria, and to increase the whipping properties of the product. The heated modified protein is then adjusted to a pH in the neighborhood of 6.7 and dried.

A specific example of the process and product is as follows:

331 gms. of sodium sulphite (2% based on wt. of flakes) were added to 430 lbs. of water heated to 130° F. The pH of the solution was 7.8. 36 lbs of solvent extracted soy bean flakes were added and the slurry was agitated for 1½ hrs. The pH of the slurry was 6.8. 10 lbs. of Celite 545 were then added and the slurry was then filtered through a Sperry filter press. The pH of the clear liquor (90° F.) was adjusted to 4.2 with sulphur dioxide, and after allowing 3 hours for settling, the supernatant was decanted off. The curd was given 2 washings with two fold volumes of water. The final solids in the curd was 13.2% and the yield of isolated protein based on the weight of the flakes was 24.6%.

50 lbs. of this curd were brought to a temperature of 100° F. and 15 gms. of pepsin were then added with moderate agitation followed by the addition of 10% hydrochloric acid, which brought the pH to 2.5. Enzymatic modification was continued for 1.5 hours and the temperature of the modified liquor was then raised to 160° F. and this temperature was held for ½ hour, and the liquor was then cooled to 90° F. and was neutralized to a pH of 6.5 with 10% caustic soda. The liquor was spray dried, using an inlet temperature of 370° F. and an outlet temperature of 170° F.

The product produced by this process contained 5.4% moisture, 11.7% ash, and 82.9% protein (N.x6.25). 68% of the total nitrogen was soluble in water at a pH of 5.0, and 28% of the nitrogen was present as nonprotein nitrogen. This product yielded 6" of foam as evaluated by the foam test, and yielded a nougat cream weighing 4 lbs./gal. on using 3 parts of whipping product to 6 parts of water and 80 parts of corn syrup and 20 parts of cane sugar.

The drainage of water from the foam of the resultant product is measured by the weep test which is caried out by adding 1½ ounces of the product to 15 ounces of water in a 10-quart Hobart bowl. Low speed mixing is carried on for one minute, followed by 3 minutes of high speed mixing. A portion of the foam is transferred to a large funnel, and the water draining from the foam is measured at different time intervals. The application of this test to the product of the invention shows the following results:

| Inches of Foam | Water Drained from Foam, in Milliliters | | |
|---|---|---|---|
| | 5 Minutes | 30 Minutes | 1 Hour |
| 6¼ | Nil | 2 cc | 5 cc |

The composition of the product may be as follows, when hydrochloric acid is used to acidify the curd prior to the enzyme treatment:

Per cent
Moisture_____ 4– 7
Protein_____ 78–84
Ash_____ 12–15
Nitrogen Free Extract_____ 0– 6

The solubility of the product at different hydrogen ion concentrations may be as follows:

Per cent
Solubility of the nitrogen at a pH of 6.8__ 71.1
Solubility of the nitrogen at a pH of 4.4__ 57
Estimated percentage of protein solubilized_ 80.2

In the preparation of light nougat cream from the modified soy protein, the product is mixed with water, agitated, and corn syrup added to the mixture. The resultant mixture is heated and mixed at high speed. For example, the laboratory procedure for preparing and evaluating the whipping product is as follows:

Sixteen parts of the product are mixed at low speed with 100 parts of water in a 10-quart Hobart bowl. The bowl is then scraped down and agitation is continued for three minutes at high speed. 500 parts of corn syrup, heated at 160° F., are then added, and mixing at high speed is continued for three minutes.

The resultant product is a very light nougat cream weighing approximately 2.75 pounds per gallon. It is of excellent body and of "short" character. When placed in an 8-ounce wide-mouthed sample bottle and the bottle capped and placed in an oven at 100° F. for 24 hours, the product shows a negligible leakage of clear solution, at most 1/16 inch.

When the nougat cream is prepared with smaller quantities of water, as in commercial procedures, the stability of nougats incubated for two weeks at 100° F. is as follows:

*Inches of syrup separating from nougat*

| Ratio of Water to Product in Preparing Nougat | | |
|---|---|---|
| 2:1 | 2½:1 | 3:1 |
| Nil | Nil | Nil |

By means of the invention, glycinin is separated and modified so as to form a product which is at least 50% soluble in water and possesses the desired whipping characteristics. The product may contain not only the water-soluble protein, but also a portion of protein hydrolysate which may be measured in terms of non-protein nitrogen present. A certain proportion of the product may also be in the form of protein which is substantially water-insoluble at a pH of 5.0. It is believed that the whipping characteristics are attributable primarily to the water-soluble protein fraction. However, the water-insoluble protein fraction and the protein hydrolysate fraction may also contribute the desired result. At any rate, regardless of the theory which may explain the whipping characteristics of the product, it has been found that the product of the invention possesses improved properties as a whipping agent.

Although the invention has been described in connection with certain specific embodiments, it will be apparent that modifications and changes may be made without departing from the spirit and scope of the invention.

I claim:

1. In a process for preparing an albumen-like soy protein with whipping properties, the steps of treating a soy protein material with pepsin in a percentage substantially less than 1% based on the protein content of the material and under conditions of temperature and acid concentration favorable to the activity of pepsin until the percentage of nitrogen soluble in water at a pH of 5.0 based on the total nitrogen originally present exceeds 40% but does not substantially exceed 68%, and then inactivating the pepsin.

2. In a process for preparing an albumen-like soy protein with whipping properties, the steps of subjecting soy bean protein to the action of pepsin in the proportion of about .35% of pepsin based on the protein content under conditions of temperature and acid concentration favorable to the activity of the pepsin until the percentage of the nitrogen originally present soluble in water at a pH of 5.0 is about 68%, then inactivating the pepsin, and drying the product at a pH below 6.5.

3. In a process for preparing an albumen-like soy protein with whipping properties, the steps of subjecting soy bean protein to the action of pepsin at a concentration in which the pepsin is substantially less than 1% based on the protein content and under conditions of temperature and acid concentration favorable to the activity of pepsin until the percentage of the nitrogen originally present soluble in water at a pH of 5.5 is about 68% and the percentage of non-protein nitrogen is from 15 to 30%, then inactivating the pepsin, and drying the product under acid conditions.

4. In a process for preparing an albumen-like soy protein with whipping properties, the steps of subjecting soy bean protein to the action of pepsin in the proportion of about .35% pepsin based on the protein content at a temperature of about 100° F. and at a pH of 2–3 to bring the percentage of the original nitrogen present soluble in water at a pH of 5.0 to about 68%, inactivating the pepsin, and drying the product under acid conditions.

JOHN R. TURNER.

REFERENCES CITED

The following references are of record in the file of this patent:

UNITED STATES PATENTS

| Number | Name | Date |
|---|---|---|
| 863,974 | Emery | Aug. 20, 1907 |
| 1,016,115 | Walland | Jan. 30, 1912 |
| 1,866,698 | Bronsztajn | July 12, 1932 |
| 2,007,962 | Burruss et al. | July 16, 1935 |
| 2,132,434 | Rauer et al. | Oct. 11, 1938 |
| 2,210,481 | Brother et al. | Aug. 6, 1940 |
| 2,217,264 | Weizmann | Oct. 8, 1940 |
| 2,232,050 | Cummins | Feb. 18, 1941 |
| 2,232,052 | Cummins | Feb. 18, 1941 |
| 2,284,700 | Wahlforss | June 2, 1942 |
| 2,361,057 | Ratzer | Oct. 24, 1944 |
| 2,381,407 | Levinson et al. | Aug. 7, 1945 |

FOREIGN PATENTS

| Number | Country | Date |
|---|---|---|
| 539,579 | Great Britain | Sept. 17, 1941 |

OTHER REFERENCES

Payne, "Advances in Protein Chemistry," vol. I, Academic Press Inc., N. Y., (1944) pages 194–196.

Enzymes by Waksman and Davidson, 1926 ed., pages 205 and 206.